Figure 3:
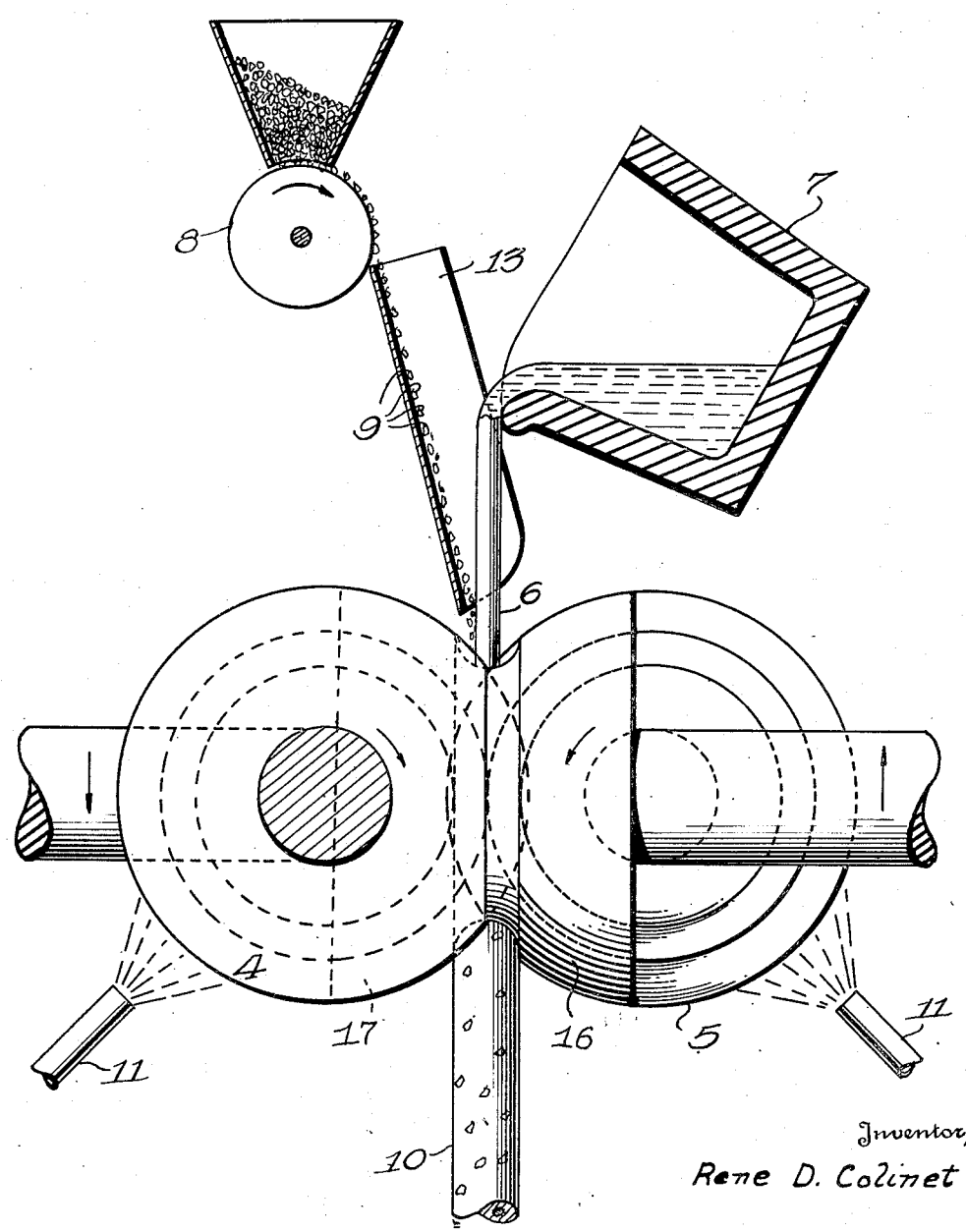

Oct. 7, 1952          R. D. COLINET          2,613,304
WELDING ROD OR WIRE
Filed Sept. 6, 1949          2 SHEETS—SHEET 1
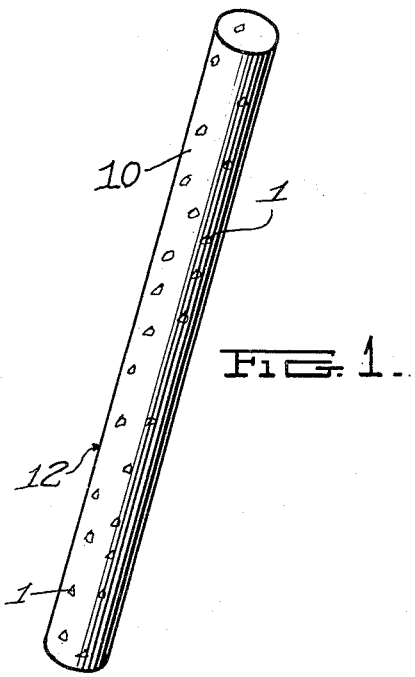
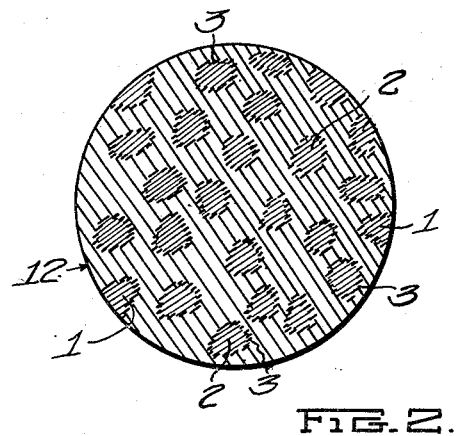
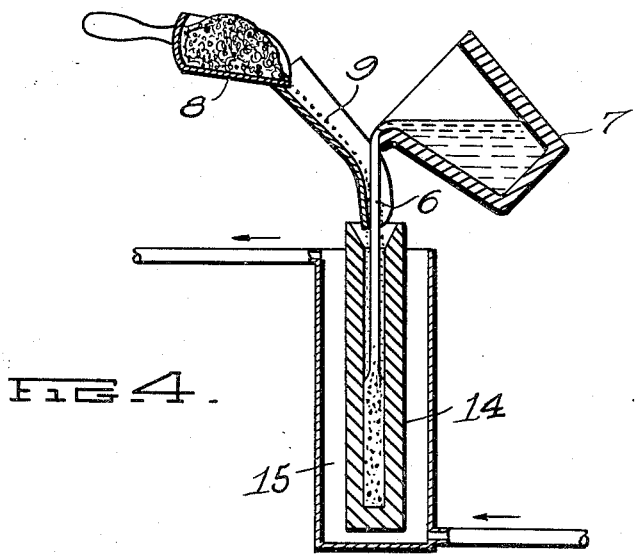
Inventor,
Rene D. Colinet
By Young, Emery & Thompson
Attorneys Oct. 7, 1952 — R. D. COLINET — 2,613,304
WELDING ROD OR WIRE
Filed Sept. 6, 1949 — 2 SHEETS—SHEET 2

Inventor,
Rene D. Colinet
By Young, Emery & Thompson
Attorneys

Patented Oct. 7, 1952

2,613,304

UNITED STATES PATENT OFFICE 2,613,304

WELDING ROD OR WIRE

Rene D. Colinet, Philadelphia, Pa., assignor to La Soudure Electrique Autogene S. A., Brussels, Belgium, a Belgian company Application September 6, 1949, Serial No. 114,085

8 Claims. (Cl. 219—8)

This application is a continuation-in-part of my co-pending application Serial No. 573,212 filed January 17, 1945.

This invention relates to welding electrodes or rods, as used in electric arc or gas welding or soldering, and more particularly electrodes or rods with additional or fluxing ingredients enclosed inside the metallic wire as particles scattered throughout the rod.

An object of the present invention is to provide an economical method for fabricating a flux-containing electrode, by simultaneously pouring in a suitable rolling mill or other convenient apparatus a stream or jet of liquid metal and a second stream or jet of solid granulated materials such as commonly used for welding fluxes or coatings. Such rolling mill or apparatus cools the jet of liquid metal immediately, without permitting any substantial amount of liquid metal to accumulate in the form of a bath between the incoming jet and the outgoing solidified wire. Only by so doing is it possible to avoid fusion of the granular solid materials despite the fact that, as a rule, their melting temperature is lower than that of the metal. By limiting to a minimum the time of contact between the liquid metal and the fluxing materials, and by sizing the latter coarser than it is customary in the making of coated electrodes, a solid metallic wire can be produced which contains a substantial amount of unmolten or only superficially fused inclusions. The wire or rod can be used in coil form for automatic arc welding with electrical contact on the surface of the wire, or it can be cut in short lengths for manual welding or soldering.

Another object of the invention is to cast welding rods in short lengths by simultaneously pouring into a tubular mold a stream or jet of liquid metal and a stream or jet of granular solid materials and providing means for fast freezing of the metal by quick removal of the heat through the walls of the mold.

A further object is to produce by this method of simultaneous casting and quick-seizing a welding electrode carrying a flux entirely free from water. In the usual dipping or extruding method for applying an external coating upon welding rods, water is necessary to provide enough fluidity or plasticity to the fluxing compound during fabrication, such excess water being partially removed by drying and oven-baking operations. There still remains, however, after baking, enough water in the flux to produce heavy spattering and exploding in the arc or in the torch flame at the time the electrode or rod is used for actual welding.

In these dipping or extruding processes, materials are introduced in the coatings for requirements other than fluxing or alloying, and some compounds may even be harmful to the actual welding operation. For instance, sodium or potassium silicate is universally used as a binder for the other fluxing ingredients, while its own fluxing qualities may very well be questioned, apart from the fact that such silicate retains water even after baking. Similarly, mechanical lubricants, such as bentonite, are needed in the extruding process, while their magnesium and aluminum constituents are considered deleterious to the welded metal, particularly in stainless steel welding. All such compounds which are either inert or detrimental to the welding qualities of the electrode are entirely eliminated in the process of the present invention, which requires no binder or lubricant whatsoever.

Another object of the invention resides in the use, as fluxing or addition ingredients, of metallic and non-metallic materials which are susceptible to water, either chemically or by soaking or absorption.

Included in that category are soluble salts such as sodium, potassium and lithium chlorides and fluorides so essential in the welding of aluminum and its alloys. The process according to this invention not only permits to use desiccated fluxing salts, but also provides the best protection against moisture absorption from the air after fabrication, since these highly hygroscopic materials are now sealed inside the metal core of the rod and remain so until they are liberated in the actual welding operation.

Further objects and advantages will appear from the following description and the drawings which show a preferred method of fabrication and in which, Figure 1 is a perspective view of the welding rod, Figure 2 is a cross-section of the rod on an enlarged scale, Fig. 3 is a diagrammatic sectional view illustrating a method of casting the rod, and Fig. 4 is a diagrammatic sectional view illustrating another method of casting the rod.

Welding electrodes or rods usually carry their flux in the form of an outside tubular coating or sheathing. Attempts have been made, however, to introduce the flux inside the core, using for instance a seamed metallic tube mechanically filled with fluxing materials in granular shape. Also known are methods to provide a wire with a central core of fused slag, obtained by rolling and drawing an ingot without scrapping the slag-rich ingot head, but such fused slag acts only as a poor flux in the welding operation because of having been already melted and oxidized prior to welding. Other known methods consist in compressing a mixture of metallic fibres and granular flux materials, or in compressing and sintering metallic powders with simultaneous or subsequent introduction of powdered flux materials. Such methods are very costly since the basic material is metal in fibrous or powder form, a highly expensive product in itself.

The method according to this invention needs only scrap, to be melted economically in any metallurgical furnace, and then poured directly into a mill together with the flux mixture or particles. No further operation is necessary, except coiling the wire or cutting it to proper length.

The preferred but not exclusive method of producing such welding electrodes involves the use of an enclosed rolling mill with rolls having spherical surfaces of mutual contact, so as to create a leak-proof funnel, all walls of which move downward to the small central opening. Enclosed rolling mills suitable for the purpose are disclosed in my application Serial No. 522,819, filed February 17, 1944. Liquid metal is poured into the mill together with the granular flux materials; it is immediately seized by the moving rolls, cooled into a plastic condition and forced down through the bight of the rolls, emerging underneath in a solid and continuous wire of constant cross-section. All flux particles have been trapped into the fast freezing metal and have become inclusions without substantially melting themselves.

Fig. 1 shows the external appearance of a welding rod 10 made by this process. Only those flux particles 1 which have been trapped between the rolls and the freezing metal are visible at the surface 12 of the wire or rod, being imbedded in the metal like stones in concrete. Other particles, completely surrounded by metal are, of course, not directly visible.

Fig. 2 which is magnified about 10 times, shows the flux particles 2 completely surrounded by metal, and other particles 1 on the periphery. The particles are superficially fused which is indicated at 3 of each particle.

Referring to Fig. 3, the rolls 4, 5, 16 and 17 of a four-roll enclosed spherical mill form the welding rod 10 from a stream 6 of liquid metal which is continuously poured from a ladle 7, while a feeding mechanism 8 pours another steady stream 9 of granulated flux into the mill at the same time by means of a guide trough 13. The heat of the metal is quickly removed by the rolls through their contact surface. The solid wire 10 emerges from the bottom in continuous production formed by the rolls from the pool 18 of metal and flux. The rolls are maintained in a cool condition by any suitable means as for instance water sprays 11.

Fig. 4 illustrates a method and an apparatus for producing welding rods in short lengths, pouring both metal 6 and flux 9 simultaneously into a tubular mold 14 of high thermal conductivity and maintained cool by a water jacket 15 in order to chill the hot metal as fast as possible.

The terms "flux" or "fluxing materials" as used herein include all such materials which are used in coatings of arc welding electrodes, namely slag-forming materials, ferro-alloys and other deoxidizers, mineral or organic compounds designated to create a gas-shield around the arc while welding, and additions to modify the chemical composition of the weld or its mechanical characteristics. They also include such additions as hard granular carbides, silicides, borides and nitrides of hard metals such as tungsten, chromium, boron, cobalt or tantalum. These ingredients may to advantage be incorporated in the flux where hard facings are to be produced.

Any known fluxing or alloying materials may be used in many different proportions, according to the desired welding qualities of the electrode. In the following a number of examples are set forth describing the chemical compositions of the welding rods, which however are not limitations:

*Example 1*

An all-position arc welding electrode having an outside diameter of ¼ inch, for the welding of low carbon steel plates or sections, is produced by pouring 4 parts by weight of liquid steel with 1 part of a dry fluxing mixture ground to approximately 40 mesh. The steel contains .08 to .12% carbon, .35 to .50% manganese, traces of silicon, .02% max. phosphorous and .02% max. sulfur. The fluxing mixture contains 5% ferrosilicon, 35% ferromanganese, 15% silica, 20% iron oxide, 15% calcium carbonate and 10% titanium dioxide.

*Example 2*

A downhand or fillet arc welding electrode for low carbon steel welding, with a diameter of $\frac{3}{16}$ inch, is produced by pouring 3 parts by weight of liquid steel with one part of a dry fluxing mixture ground to approximately 40 mesh. The steel has the same analysis as Example 1, but the flux contains 30% silica, 55% iron oxide and 15% ferromanganese.

*Example 3*

An electrode for the arc welding of low alloy steels, and also for straight chromium or nickel-chromium stainless steels (12 to 18% chromium, or 18% chromium with 8% nickel, or 20 to 25% chromium with 12 to 20% nickel) is produced by pouring a stream of liquid steel having an analysis corresponding to that of the metals to be welded, together with a stream of powdered flux, ground to approximately 40 mesh, having the following composition: 50% calcium carbonate, 30% fluorspar, 10% titanium dioxide, 6% ferrosilicon and 4% ferromanganese. One part by weight of the mixture is added to 3 to 4 parts of liquid steel, depending on the size of the electrode and other factors.

Methods of casting welding rods with entrapped flux, other than shown or described here, are possible, within the limitations of the appended claims.

The wire or rod as shown and described may be made in any configuration and any number of flux particles per square inch of the rod may be used.

The metal or alloy forming the matrix of the welding rod or wire may be of any of the metals or alloys employed in welding rods and wires, including, without limitation, iron, steel, stainless steel, copper, copper base alloys, aluminum, aluminum base alloys, magnesium, magnesium base alloys, nickel, nickel base alloys.

It will be evident that the quantity of flux employed will vary with the metal or alloy used for the matrix and with the fluxing ingredients employed. Good results are obtained however with contents of flux by weight in the range between 2 and 50% of the total welding rod or wire, preferably between 5 and 35% and most desirably between 10 and 25%. This flux is of course dispersed through the entire mass of the metal in the form of granules.

The flux granules, although they normally consist of fluxing ingredients which melt below the melting point of the metal or alloy matrix complex, never become fully molten in the process of forming the welding rod or wire but remain in the final rod or wire superficially fused or melted and throughout the bulk of each granule unfused and unmelted. The tendency of the granules to separate out and to agglomerate is avoided because they do not have any time to separate or agglomerate as they are imprisoned in the rapidly solidified mass.

The surrounding matrix of the metal or alloy in the welding rod or wire protects the fluxing ingredients against atmospheric deterioration and permits the use of water sensitive and even hygroscopic solids such as metallic sodium, potassium, lithium, calcium, barium and their compounds such as their oxides, chlorides, fluorides and other halogen compounds without danger of deterioration, since the metal matrix closed around the dispersed granules forms a moisture-tight envelope. It will also be evident that the invention permits the formation of a welding rod or wire containing such water-sensitive materials which could not be used at all when the flux is applied by usual methods such as dipping or extrusion, which rely on pastes containing water as a normal ingredient.

The metallic matrix of the invention exhibits a metallographic structure indicative of continuous casting, in which coarse grain (ASTM standard grain size number 1 or larger) is found adjacent to zones of fine grain (ASTM standard number 6 or 8). See Metals Handbook (1948 edition) pages 401–403, inclusive.

I claim as my invention:

1. A welding rod or wire, comprising an aggregate of solid fluxing particles dispersed throughout a continuous solid mass of a matrix metal of substantially higher melting point than the fluxing particles, the solid fluxing particles being not fused in contact with the molten matrix metal, said metal having a metallic structure indicative of fast-cooling casting followed by mechanical compression in the plastic stage.

2. A welding rod or wire, comprising an aggregate of potentially reactive solid fluxing materials, the latter being dispersed in particles throughout a continuous solid mass of a matrix metal of substantially higher melting point than the fluxing materials, said fluxing materials being substantially unadulterated by chemical reactions which would normally result from prolonged contact with the molten matrix metal, said metal having a metallographic structure indicative of fast-cooling casting followed by mechanical compression in the plastic stage.

3. A welding rod or wire, comprising an aggregate of potentially reactive dry solid fluxing materials, which would normally react chemically with water and air moisture, said fluxing materials being dispersed as sealed-in particles throughout a continuous solid mass of matrix metal of substantially higher melting point than the fluxing materials and said fluxing materials being substantially unadulterated by chemical reactions which would normally result from prolonged contact with the molten matrix metal, said metal having a metallographic structure indicative of fast-cooling casting, followed by mechanical compression in the plastic stage.

4. A welding rod or wire, comprising an aggregate of potentially reactive solid fluxing materials which would normally react chemically with the atmospheric oxygen, said fluxing materials being dispersed as sealed-in particles throughout a continuous solid mass of matrix metal of substantially higher melting point than the fluxing materials, said fluxing materials being substantially unadulterated from chemical reactions which would result from prolonged contact with the molten matrix metal, said metal having a metallographic structure indicative of fast-cooling casting, followed by mechanical compression in the plastic stage.

5. A welding rod or wire, comprising an aggregate of potentially reactive hygroscopic dry solid fluxing materials, said fluxing materials being dispersed as sealed-in particles throughout a continuous solid mass of matrix metal of substantially higher melting point than the fluxing materials, said fluxing materials being substantially unadulterated by chemical reactions which would result from prolonged contact with the molten matrix metal, said metal having a metallographic structure indicative of fast-cooling casting, followed by mechanical compression in the plastic stage.

6. A welding rod or wire comprising an aggregate of fluxing particles dispersed throughout a continuous solid mass of a matrix metal of substantially higher melting point than the fluxing particles, said fluxing particles being substantially chemically uncombined with the metal and retaining their individual crystallographic structure, and said metal having substantially a typical cast structure.

7. A welding rod or wire, comprising an aggregate of potentially reactive dry solid fluxing materials, which would normally react chemically with water and air moisture, said fluxing materials being dispersed as sealed-in particles throughout a continuous solid mass of matrix metal of substantially higher melting point than the fluxing materials, said fluxing materials being substantially chemically uncombined with the metal and retaining their individual crystallographic structure, and said metal having a typical cast structure.

8. A welding rod or wire comprising an aggregate of potentially reactive solid fluxing materials which would normally react chemically with the atmospheric oxygen, said fluxing materials being dispersed as sealed-in particles throughout a continuous solid mass of matrix metal of substantially higher melting point than the fluxing materials, said fluxing materials being substantially chemically uncombined with the metal and retaining their individual crystallographic structure, and said metal having a typical cast structure.

RENE D. COLINET.

REFERENCES CITED

The following references are of record in the file of this patent:

UNITED STATES PATENTS

| Number | Name | Date |
|---|---|---|
| 1,972,463 | Schlecht et al. | Sept. 4, 1934 |
| 1,977,361 | Taylor | Oct. 16, 1934 |
| 2,002,198 | Wissler | May 21, 1935 |
| 2,002,462 | Woods | May 21, 1935 |
| 2,471,931 | Castro et al. | May 31, 1949 |